United States Patent [19]
Meyer et al.

[11] 3,782,193
[45] Jan. 1, 1974

[54] FLOWMETER APPARATUS

[75] Inventors: Thomas I. Meyer, Severna Park;
Thomas N. Shaffer, Silver Spring;
Lawrence G. Wright, Pasadena, all
of Md.

[73] Assignee: Westinghouse Electric Corporation,
Pittsburgh, Pa.

[22] Filed: June 6, 1972

[21] Appl. No.: 260,227

[52] U.S. Cl. .................................. 73/181, 73/194 B
[51] Int. Cl. .............................................. G01c 21/10
[58] Field of Search .......................... 73/181, 194 B;
340/5 S, 8 D

[56] References Cited
UNITED STATES PATENTS

| | | | |
|---|---|---|---|
| 3,222,926 | 12/1965 | Carver | 73/181 |
| 2,480,646 | 8/1949 | Grabau | 73/181 |

Primary Examiner—Donald O. Woodiel
Attorney—F. H. Henson et al.

[57] ABSTRACT

Three posts mounted on the underside of a ship transmit acoustic signals to and from one another for computation of ship's speed. The posts are streamlined for traveling through the water and each includes at the lower end thereof a streamlined housing having a cavity in which is positioned a transducer assembly. The cavity is covered by a thin acoustic window along the streamlined surface. Water is introduced between the transducer assembly and the window for proper signal coupling such that a propagated acoustic signal is properly transmitted to the transducer assembly in another post. Due to the streamlining, the acoustic signals impinge at different angles upon at least two of the posts and the acoustic windows for these two different posts are of different materials and carefully chosen to insure proper signal reception.

11 Claims, 18 Drawing Figures

FLOWMETER APPARATUS

BACKGROUND OF THE INVENTION

The invention in general relates to flowmeter apparatus for measuring relatively fluid velocity, and particularly, to apparatus used in the measurement of ship's speed.

DESCRIPTION OF THE PRIOR ART

Apparatus for measuring ship's speed includes two streamlined housings mounted on a line parallel with the fore-aft axis of the ship and wherein acoustic energy is propagated between transducer assemblies in the housings. Since acoustic energy transmitted from the forward housing to the aft housing is speeded up by the relative velocity of the water, and acoustic energy transmitted from the aft housing to the forward housing is retarded by the relative velocity, the difference in propagation times is an indication of the relative velocity (speed).

The measurement of side slip as well as forward speed is highly desirable in many installations and this is not possible with a two element configuration. For such measurement, prior art apparatus utilizes three streamlined units arranged as two forward units and the one aft unit with the acoustic signal paths between the two forward units and the aft unit forming a certain angle.

The transducer assemblies which transmit and receive the acoustic signals are positioned within cavities in the streamlined housings and the cavities filled with a material known as RHO-C rubber, which in addition to filling the cavity, takes on the contour of the streamlined housing at the water interface. Because of the streamlined shape the acoustic energy in such an arrangement does not propagate normal to the housing-water interface. Although the rubber has the same sound velocity properties as water, the match is only at one temperature. Accordingly, the acoustic signal becomes degraded due to the refraction at certain other temperatures.

Due to this inverse relationship of the sound velocity-temperature between the rubber and water, the velocity calculation based upon the time difference in travel of acoustic energy is in error since the time spent in the rubber medium by the acoustic signal varies with temperature.

The use of the rubber also tends to limit the maximum measurable speed since at higher velocities the rubber would deform and cavitation would occur causing a loss of acoustic signal.

SUMMARY OF THE INVENTION

Flow meter apparatus is provided which includes a plurality of transducer stations interfacing with a fluid medium, the relative velocity of which is to be measured. Each station includes a streamlined housing having a cavity in which is positioned a transducer assembly for projecting and/or receiving acoustic energy along a signal path. A relatively thin acoustic window covers the cavity at the housing-water interface and a coupling medium such as water is provided between the transducer assembly and the acoustic window. The common signal path between a first and second of the transducer stations is at a first angle with respect to the acoustic window of the first transducer station and at a second and different angle with respect to the acoustic window of the second transducer station. In order to avoid signal degradation the acoustic windows of the first and second transducer stations are of carefully chosen and different materials.

DESCRIPTION OF THE PREFERRED EMBODIMENT

Figure 1:
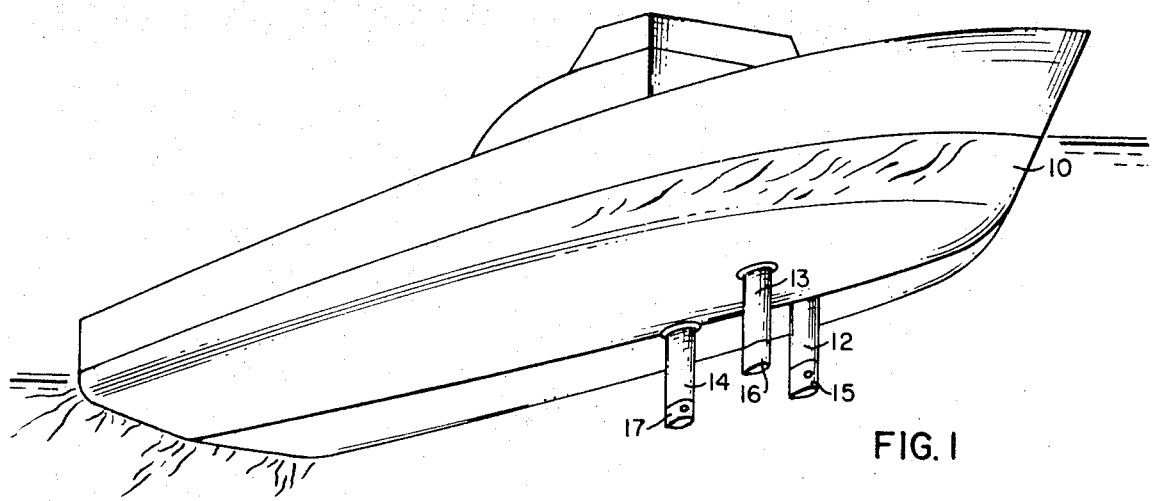
FIG. 1 illustrates the flowmeter apparatus mounted on the underside of a ship.

Although the present invention is applicable in various fluid flow measuring systems, it will be described in particular with respect to apparatus for measuring ship's speed, an example of which is illustrated in FIG. 1.

Mounted on the underside of ship 10 are three transducer stations 12, 13, and 14, each in a form of a streamlined post to minimize water turbulence.

Figure 2:
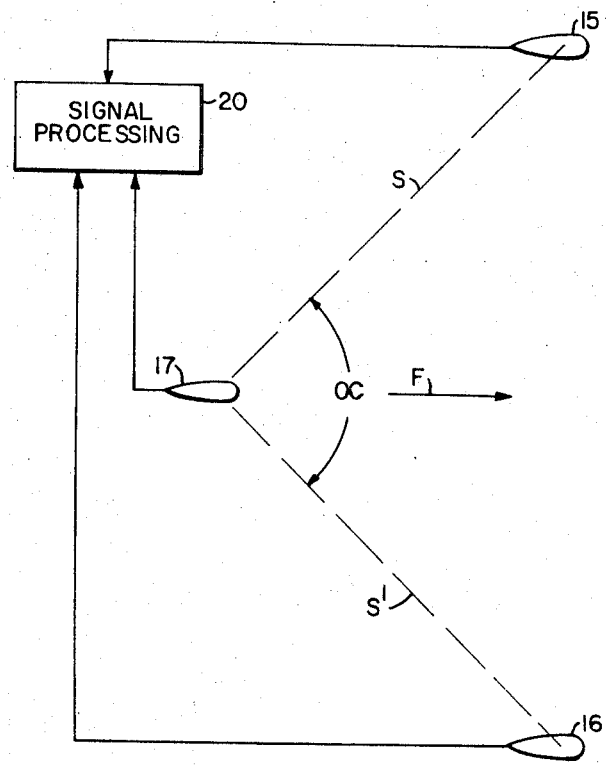
FIG. 2 illustrates the relative positioning of the ship mounted transducers stations of FIG. 1.

At the lower portion of each post and forming a continuation thereof, there is provided a respective streamlined housing 15, 16, and 17, which contain acoustic projection and reception transducer assemblies. The streamlined shapes and respective positioning of these housings are illustrated in FIG. 2.

The port and starboard streamlined housings are represented respectively by the numerals 15 and 16, and the aft streamlined housing is represented by the numeral 17. S represents the path of acoustic signal transmission between transducer stations 12 and 14, and more particularly, between transducer assemblies positioned in housings 15 and 17. Similarly, S' is the path starboard signal transmission between the aft housing 17 and the stargoard housing 16. In actuality, signal transmission between the housings is in the form of compressional waves through the fluid medium, with the waves having a certain pressure intensity relative to the path of transmission in accordance with a certain beam pattern. This is well known to those skilled in the art, and for ease of explanation, the waves will be represented herein by straight lines or rays.

The housings are oriented such that the paths S and S' form an angle $\alpha$, preferably 90°, and the forward direction of the ship is represented by the arrow F which is parallel to the fore-aft axis of the ship.

Although various acoustic flow measuring schemes may be utilized, it is preferable that a single path arrangement between transducer stations be utilized with the transducer assemblies acting both as a transmitter and a receiver of projected acoustic energy. Signal processing apparatus 20 provides the necessary energizing signals to transducer assemblies in housings 15 and 17 for simultaneously and repetitively projecting acoustic pulses toward one another and is thereafter operable to compute the difference in time arrivals of transmitted acoustic pulses between these units. The signal processing apparatus is also operable to simultaneously supply energizing signals to transducer assemblies in housings 17 and 16 for projection of acoustic energy along path S' and thereafter process the received signals such that ship's forward and sideway velocity components may be obtained.

Figure 3:
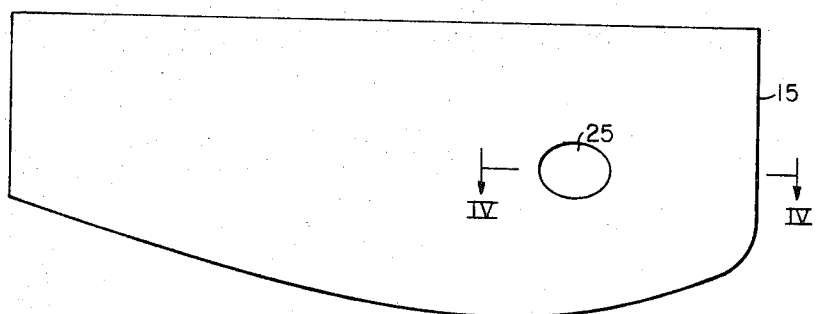
FIG. 3 is a side view of the lower housing portion of one of the forward units illustrated in FIG. 1.
Figure 4:
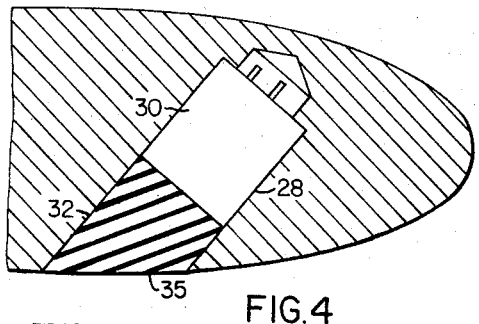
FIG. 4 is a cross-sectional view along the lines IV—IV of FIG. 3 and illustrates the prior art.

FIG. 3 illustrates a side view of a streamlined housing such as 15 connectable with the lower end of transducer station 12. Acoustic energy is transmitted and received through an aperture 25 which in the prior art apparatus had been filled with a rubber material having acoustic transmission properties similar to seawater. FIG. 4 is a view along line IV—IV of FIG. 3 and illustrates a typical prior art arrangement.

A hole or cavity 28 was formed in the housing 15 and a transducer assembly 30 was inserted therein. The remainder of the cavity between the transducer assembly 30 and the outside surface of the housing 15 was sealed with the aforementioned rubber 32 and faired to the housing 15 at the surface.

Figure 5:
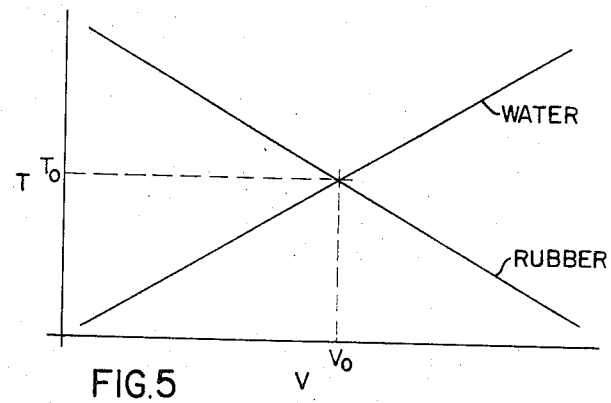
FIG. 5 is a curve illustrating the temperature versus velocity characteristics of water and RHO-C rubber.

Under ideal operating conditions, such an arrangement provided satisfactory results. A difficulty arises, however, since in reality the acoustic transmission properties of the rubber 32, as the temperature varies, are inversely related to the acoustic transmission properties of water and consequently, the velocity of sound in both mediums was the same only at a particular temperature. This relationship is illustrated in the curves of FIG. 5, wherein the vertical axis represents temperature and the horizontal axis represents velocity. From FIG. 5 it can be seen that as temperature increases, the velocity of sound in water also increases, whereas in the rubber, just the opposite is true and consequently there is a match at only one temperature $T_0$ where the velocity of sound is the same, $V_0$, in both mediums.

Due to this phenomena, and with reference again to FIG. 4, refraction of the acoustic signal would occur at the interface 35 which would progressively get worse and cause loss of acoustic signal as larger deviations from $T_0$ occurred.

Additionally, the velocity calculation was in error at all but temperature $T_0$ since the transit time in the rubber 32 would vary as temperature varied.

Although the rubber 32 was faired to the housing 15, such fairing was extremely difficult to obtain and at higher velocities the rubber deformed due to a pressure gradient across its face thereby resulting in cavitation at higher speeds and a consequent loss of acoustic signal.

Figure 6A:
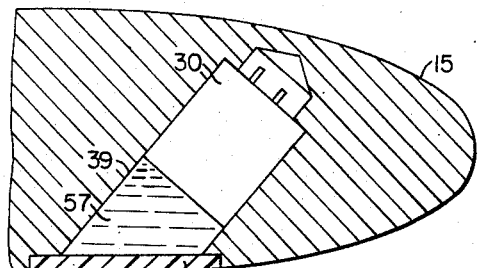
FIGS. 6A and 6B are cross-sectional views as in FIG. 4 but illustrate the preferred embodiment of the present invention.
Figure 6B:
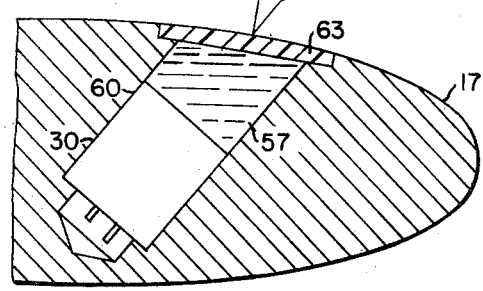

The above problems were totally eliminated by the present invention, a preferred embodiment of which is illustrated in FIGS. 6A and 6B which are views, as in FIG. 4, of port housing 15 and aft housing 17, respectively.

Figure 7:
FIG. 7 is a cross-sectional view of a typical transducer assembly which may be utilized herein.

Referring to FIG. 6A, a cavity 39 may be drilled or formed in housing 15 and a transducer assembly 30 placed therein. One type of transducer assembly which may be utilized is illustrated in cross-sectional view in FIG. 7 to which reference is now made.

The assembly 30 includes a transducer active element 42 such as barium titanate, with a suitable backing means such as an absorber 44 supported or backed by a pressure plate 46 carrying pins 49 for making electrical connection with the active element 42 in a well known manner. The assembly is then covered by a thin layer of elastomerical material 52. Since the covering 52 is so thin, any acoustic transmit time variation through it as the temperature changes is insignificant.

Referring back to FIG. 6A, a relatively thin acoustic window 55 covers the cavity 39 and is bonded to the housing 15. The transducer assembly 30 is spaced from the thin acoustic window 55 for transmission and reception of acoustic energy along the signal path S, also illustrated in FIG. 2. A coupling medium 57 is interposed between the transducer assembly 30 and the acoustic window 55 and has acoustic transmission properties similar to the medium in which the apparatus is to operate, in the present case, seawater. In the preferred embodiment, the coupling medium 57 is actually water.

In those operational situations where water might tend to evaporate, thus requiring constant replenishment, it is preferred that such coupling medium 57 take the form of water held in a colloidal suspension. One example of this is a gel which is a colloid in which the disperse phase has combined with the continuous phase to produce a jelly-like product. A medium which has been successfully used in the present invention is agaragar, which prior to mixing with the water, is a dried hydrophilic, colloidal substance extracted from various marine species of Gelidium and Algae.

The housing 17 of FIG. 6B is similar in that it includes a cavity 60 in which is positioned a transducer assembly 30 spaced from a thin acoustic window 63 with the space between them filled with a coupling medium 57 such as the agar-agar described. Due to the orientation of the housings, as illustrated in FIG. 2, and due to the streamlined curvilinear surface of the housings, the signal path S lies at an angle $\phi_1$ with respect to the normal N of acoustic window 55 of the port housing 15, and lies at a different angle $\phi_2$ with respect to the normal N of acoustic window 63 of the aft housing 17

Although seemingly insignificant, the difference between these two angles $\phi_1$ and $\phi_2$ could conceivably result in extraneous and unwanted acoustic signals which would tend to cause improper operation and reduce accuracy. This problem is best explained with initial reference to FIG. 8 illustrating the basic theory of reflection and refraction at plane surfaces.

Figure 8:
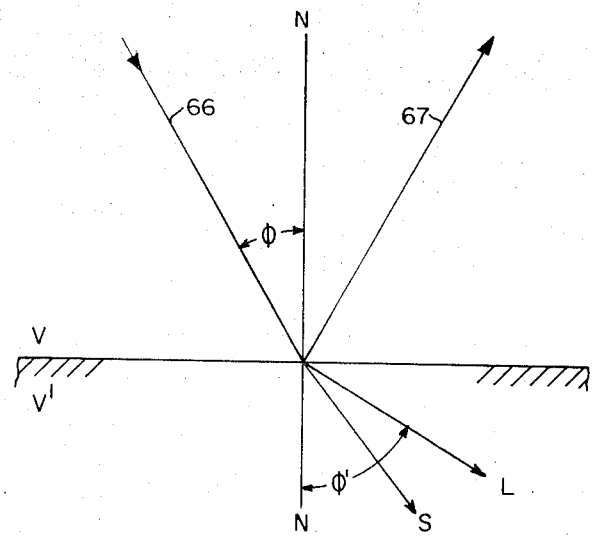
FIGS. 8 and 9 are ray diagrams illustrating the principle of reflection and refraction of acoustic energy traveling in one medium and incident on a surface bounding a second medium in which the velocity of propagation differs from that in the first.

In FIG. 8 ray 66, representing a longitudinal acoustic wave, travels through a first medium in which the velocity of sound is V. The wave strikes a second medium in which the velocity of sound is V', at an angle $\phi$ measured from the normal N. The longitudinal wave is reflected at the interface, the reflected wave being represented by ray 67, and is also transmitted into the second medium as a longitudinal wave L lying at an angle $\phi'$ with respect to the normal N. The relationship between the angles and the velocity of sound is given as:

$$\text{sine } \phi / \text{sine}\phi' = V/V'$$

Eq. (1)

FIG. 8 is drawn for the situation where V' is greater than V. If the second medium is a solid, the incident wave, in addition to producing a longitudinal wave L, will also produce a shear wave S. There is a critical angle $\phi_c$ for the incident longitudinal wave for which the refracted wave emerges tangent to the surface. That is, $\phi'$ is 90° and sine $\phi'$ is 1. Equation 1 therefore becomes:

$$\text{sine } \phi_c = V/V'$$

Eq. (2)

Figure 9:
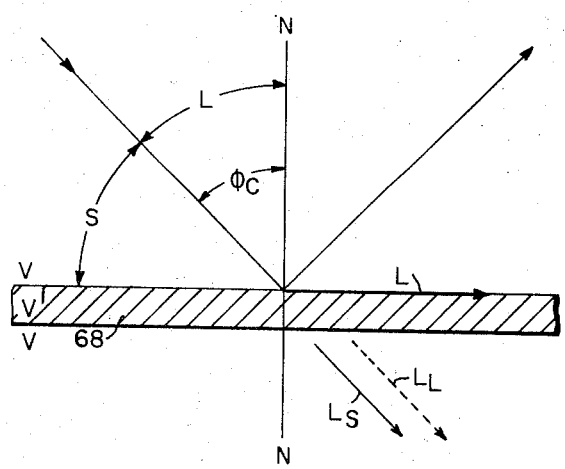

This situation is illustrated in FIG. 9 where the second medium is illustrated as a thin window 68 having water on either side of it. At the critical angle $\phi_c$ a shear wave is propagated in the window 68 which when striking the lower interface is converted back to a longitudinal wave $L_s$.

FIG. 9, however, represents the idealized situation. In actuality, as applied to the apparatus described, the thin window 68 has a slight curvature following the streamlining of its housing. Additionally the wave front of impinging acoustic energy is not exactly planar but is somewhat spherical. $\phi_c$ therefore is a nominal critical angle and the above factors result in a longitudinal wave being propagated in the window which emerges on the other side of the window as a longitudinal wave $L_L$, shown dotted.

It may be stated that in general any incident wave striking the window 68 within the angular region L will produce a predominantly longitudinal mode wave in the window 68 and the wave $L_L$ on the other side of the window 68 will predominate. If the incident ray strikes the interface within the angular region S, the shear wave, and consequently the longitudinal wave $L_s$ will predominate.

Figure 10A:
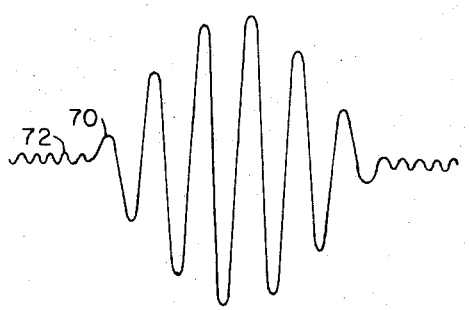
FIGS. 10A and 10B illustrate, respectively, a desired signal to be processed, and a degraded undesirable signal which the present invention obviates.
Figure 10B:
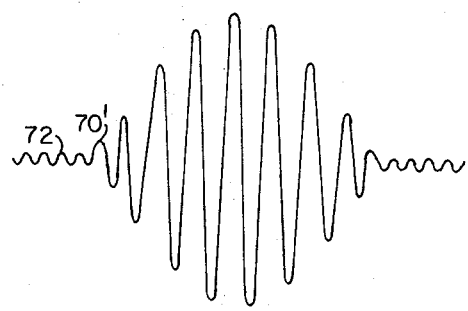

If acoustic window 68 is part of an arrangement such as illustrated in FIG. 6A or 6B, the effect of the two waves $L_L$ and $L_s$ would be to cause signal degradation. By way of example, this is illustrated in FIGS. 10A and 10B in which FIG. 10A illustrates a typical signal provided by a transducer assembly upon impingement of a high frequency acoustic pulse. In order to measure time difference of arrival of oppositely transmitted acoustic pulses, it is necessary to start the time measurement process when the first half cycle 70 is received and detected. This first half cycle is sufficiently distinguishable over the noise 72 and can easily be detected. Since the travel times of the shear and longitudinal waves are different, if two different signals such as $L_L$ and $L_s$ of FIG. 9 are received by the transducer assembly at different times an interference results wherein the first half cycle 70', as illustrated in FIG. 10B, cannot be adequately detected above the noise 72 and consequently the thresholding apparatus for detecting this half cycle may not provide the proper output signal until several half cycles later resulting in impaired accuracy of the overall system.

If the apparatus could be arranged such that the incoming (or outgoing) acoustic energy could impinge upon the respective acoustic windows only in the region L in FIG. 9, or only in the region S, satisfactory operation could be obtained. It would be preferred, however, that the incident signal strike the window at an angle at least 5° removed from the critical angle $\phi_c$. A problem arises, however, in that the critical angle $\phi_c$ is dependent upon the velocity V and for the typical environment illustrated, the velocity V varies as the temperature varies.

Figure 11:
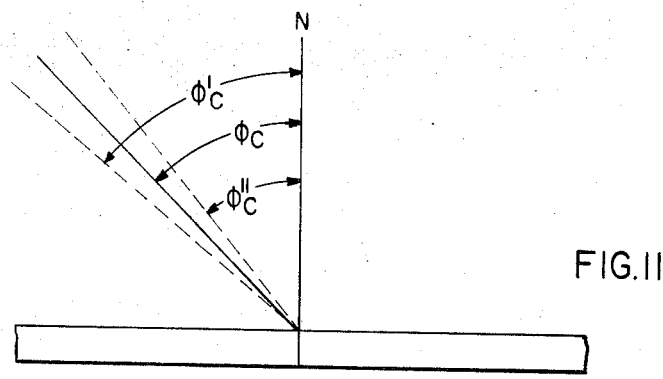
FIG. 11 is a ray diagram similar to FIG. 9 illustrating a varying critical angle.

FIG. 11 illustrates the critical angle $\phi_c$, but as the water temperature changes throughout its changeable range, the critical angle also changes throughout a range from $\phi_c'$ to $\phi_c''$. Keeping these principles in mind, and with reference again to FIGS. 6A and 6B, it is necessary that the signal path S strike the acoustic windows 55 and 63 at an angle at least 5° removed from the critical angle for all variations of the critical angle due to temperature changes. In order to accomplish this result, and in view of the fact that angles $\phi_1$ and $\phi_2$ are different, the present invention provides for acoustic windows 55 and 63 being made of different materials. By way of example, with the orientation as in FIG. 2, angle $\phi_1$ would be equal to approximately 50.5° and angle $\phi_2$ would be equal to approximately 35.5°. Assuming a velocity variation in water of from 1,400 meters per second to 1,580 meters per second, acoustic window 55 could be an acrylic such as a polymerized methyl methacrylate, one example being sold under the trade name Plexiglas.

The aft acoustic window 63 could then be made of a polyester such as an acrylonitrile butadienestyrene, one example being sold under the trade name of ABS.

The longitudinal acoustic velocity in Plexiglas is approximately 2,647 meters per second Substituting in equation (2), the critical angle for FIG. 6A would vary between approximately 31.9° and 36.6° due to the velocity variation in the water. This variation in critical angle is shown as the shaded area 75 in FIG. 12.

Figure 13:
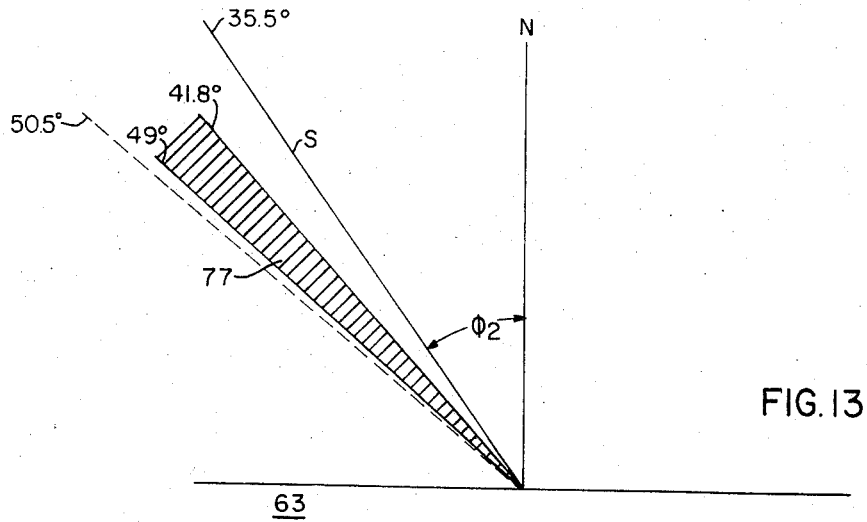

With the aft acoustic window 63 being ABS plastic, wherein the acoustic velocity is approximately 2,100 meters per second, the critical angle would vary between approximately 41.8° and 49°, such variation being the shaded zone 77 in FIG. 13.

Figure 12:
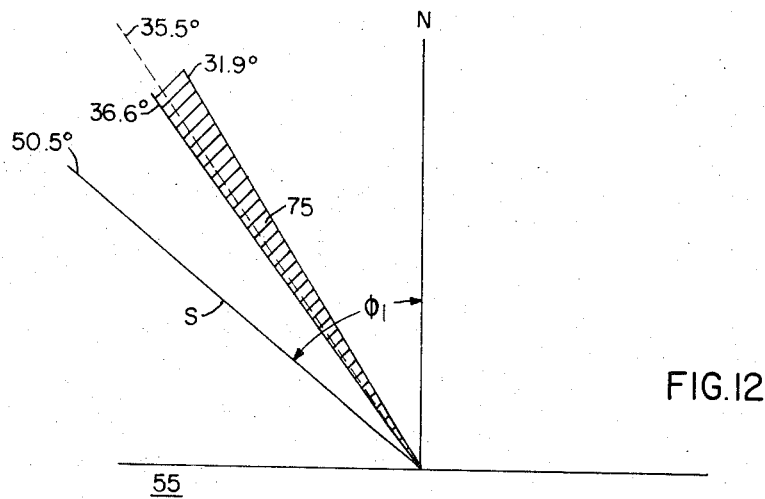
FIGS. 12 and 13 are also ray diagrams to aid in an understanding of the present invention.

FIGS. 12 and 13 have been oriented similar to FIGS. 9 and 11 but in actuality represent the situations for the arrangement of FIGS. 6A and 6B. In FIG. 12, the acoustic signal path S lies at an angle $\phi_1$ of 50.5° which is more than 5° removed from the critical angle zone 75. For purposes of comparison, if the aft acoustic window 63 were also made of Plexiglas, the acoustic signal path (shown dotted) lying at an angle of 35.5° would fall right in the critical angle zone 75, and system accuracy would be severely degraded as previously discussed.

In FIG. 13 illustrating the situation for the aft housing, the signal path S lying at an angle $\phi_2$ of 35.5° is more than 5° removed from the critical angle zone 77. If the port acoustic window 55 were also made of ABS plastic, the signal path S (shown dotted) lying at an angle of 50.5° would not be at least 5° removed from the critical angle zone 77 and degraded operation would occur.

Thus, proper operation is attained with the use of different materials whose respective speed of sound is chosen such that the signal path angle is at least approximately 5° removed from the critical angle determined by the longitudinal velocity of propagation, for all variations of the critical angle due to temperature changes. The relatively thin plastic acoustic windows provide a hard surface which is easily contoured to the proper shape of the respective housings and result in a smooth streamlined surface which does not deform at increased ship velocities.

Figure 14:
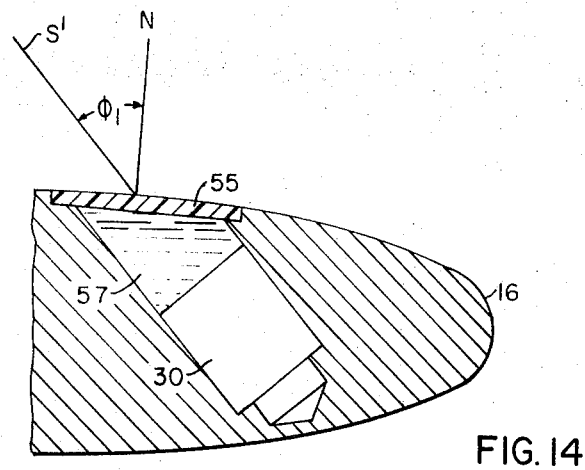
FIG. 14 is a cross-sectional view illustrating the third housing.
Figure 15:
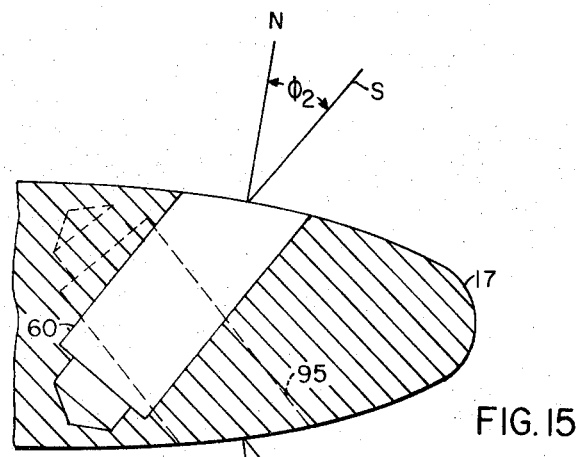
FIG. 15 is a cross-sectional view of the aft housing showing the positions of two cavities therein.

As illustrated in FIG. 14, the transducer housing unit 16 is similar to the arrangement illustrated in FIG. 6A in that the housings have the same contour and streamlined shape, the angles $\phi_1$ are of the same magnitude, and the acoustic windows 55 are of identical material. Each of the forward housings, 15 and 16 include one cavity and transducer assembly whereas the aft housing 17 would include two transducer assemblies, one for communication with the transducer assembly in housing 15 and the other for communication with the transducer assembly in housing 16 as illustrated in FIG. 15. This second transducer housing would be located within a cavity 95 in the housing 17, and would transmit through an acoustic window identical to acoustic window 63 with agar-agar disposed between the transducer assembly and the acoustic window. The signal path would be at the same angle $\phi_2$ with respect to the acoustic window except emanating from the right side of the housing 17. Since the width of the housing 17 is relatively narrow, such additional cavity 95 is drilled at a lower (or higher) position in the housing 17.

Figure 16:
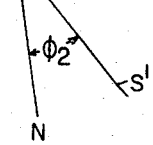
FIG. 16 is a side view of the lower streamlined housing with a portion broken away.

FIG. 16 is a view of a typical housing such as 15 with a portion cut away to illustrate the method of introducing the coupling medium 57. In the preferred embodiment a distilled water solution containing 0.25 percent agar-agar by weight is first boiled and then poured into cavity 39, while in its liquid state, through fill column 80. After the solution gels, a thin layer of an elastomeric such as rubber 82, is placed on top of the gel to seal the cavity. A countersunk portion 84 of the fill hole is then sealed with an aluminum disk 87 and a second layer of rubber 89, preferably an RTV silicone rubber. This arrangement results in a short column of air 92 which together with the thin sealing layer of rubber 82 permits thermal expansion of the solution without significantly increasing the internal pressure. The agar-agar gel, unlike pure water, is capable of supporting the rubber and its use reduces the possibility of air entrapment. The agar-agar gel is not identical to the liquid medium (sea-water) in which the apparatus operates, however, tests have indicated that there is no appreciable difference in the acoustic property of the agar-agar solution as compared to seawater.

We claim:
1. Flowmeter apparatus comprising:
   a. a plurality of transducer stations for interfacing with a fluid medium;
   b. each said transducer station including a housing having a cavity therein, a transducer assembly and a relatively thin acoustic window covering said cavity;
   c. said transducer assembly being positioned within said cavity and spaced from said acoustic window for projection and/or reception of acoustic energy therethrough, along a signal path to or from the transducer assembly of another said transducer station;
   d. a coupling medium disposed between said transducer assembly and said acoustic window and having acoustic transmission properties similar to the medium in which the apparatus is to operate;
   e. a signal path between a first and second of said transducer stations when in operation being at a first angle with respect to the acoustic window of said first transducer station and being at a second and different angle with respect to the acoustic window of said second transducer station;
   f. the acoustic windows of said first and second transducer stations being of different materials.

2. Flowmeter apparatus for measuring ship's speed comprising:
   a. at least 3 posts for mounting on said ship for communication with the water;
   b. each said post having a respective streamlined housing connected thereto;
   c. each said housing including a cavity, a transducer assembly and a relatively thin acoustic window covering said cavity;
   d. said transducer assembly being positioned within said cavity and spaced from said acoustic window for projection and for reception of acoustic energy therethrough along a signal path;
   e. a third of said housings including an additional cavity, acoustic window and transducer assembly;
   f. an acoustic coupling medium disposed between each said transducer assembly and its respective acoustic window;
   g. said housings being arranged that the transducer assemblies in the first and third housings are in signal communication along a first signal path and in the second and third housings are in signal communication along a second signal path.

3. Apparatus according to claim 2 wherein:
   a. said acoustic windows of said first and second housings being of the same material and being of a different material from the acoustic window of said third housing.

4. Apparatus according to claim 2 wherein:
   a. said first and second signal paths are at an angle of 90° with respect to one another.

5. Apparatus according to claim 2 wherein:
   a. each said post forms a streamline continuation of its respective streamlined housing.

6. Apparatus according to claim 2 wherein:
   a. each said acoustic window forms a streamlined continuation in the surface of its respective housing.

7. Apparatus according to claim 6 wherein:
   a. each said acoustic window is bonded to its respective housing.

8. Apparatus according to claim 2 which includes:
   a. signal processing equipment for providing and receiving signals to and from said transducer assemblies and for processing said signals for computation of ship's speed.

9. Apparatus according to claim 3 wherein:
   a. the longitudinal acoustic velocity in the acoustic windows of said first and second housings is greater than the longitudinal acoustic velocity in the acoustic windows of said third housing.

10. Apparatus according to claim 2 wherein:
    a. said acoustic coupling medium is a gel.

11. Flowmeter apparatus comprising:
a. at least two transducer stations each including an acoustic window and transducer means for projection and/or reception of acoustic energy through said window along a signal path;
b. said signal path lying at a first angle with respect to one of said acoustic windows and at a second and different angle with respect to the other acoustic window;
c. said acoustic windows being of different materials whose respective speed of sound is chosen that the signal path angle is at least approximately 5° removed from the critical angle determined by the longitudinal velocity of propagation, for all variations of the critical angle due to temperature changes.

* * * * *